United States Patent
Ko et al.

(10) Patent No.: US 7,634,255 B2
(45) Date of Patent: Dec. 15, 2009

(54) METHOD FOR REPORTING ACTIVATION STATUS OF FEATURE SERVICE IN MOBILE COMMUNICATION SYSTEM

(75) Inventors: Hong-Gi Ko, Kyungki-Do (KR); Seong-Ju Ahn, Kyungki-Do (KR); Sung-Ah Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/601,660

(22) Filed: Nov. 20, 2006

(65) Prior Publication Data

US 2007/0066324 A1    Mar. 22, 2007

Related U.S. Application Data

(63) Continuation of application No. 09/984,031, filed on Oct. 26, 2001, now Pat. No. 7,187,939.

(30) Foreign Application Priority Data

Oct. 30, 2000  (KR) ............................... 63982/2000
Dec. 28, 2000  (KR) ............................... 84716/2000

(51) Int. Cl.
   *H04M 3/42*   (2006.01)
(52) U.S. Cl. ................ 455/414.1; 455/435.1; 455/419; 379/201.03; 379/207.11; 379/207.02
(58) Field of Classification Search .............. 455/414.1, 455/418–419, 432.2, 432.3, 435.1; 379/201.01–218.02
   See application file for complete search history.

(56) References Cited

U.S. PATENT DOCUMENTS

| | | | |
|---|---|---|---|
| 5,890,063 A | 3/1999 | Mills | 455/433 |
| 5,913,165 A | 6/1999 | Foti | 455/435.3 |
| 5,966,671 A | 10/1999 | Mitchell et al. | 455/550.1 |
| 6,029,065 A * | 2/2000 | Shah | 455/414.4 |
| 6,131,024 A | 10/2000 | Boltz | 455/405 |
| 6,195,547 B1 | 2/2001 | Corriveau et al. | 455/419 |
| 6,301,484 B1 | 10/2001 | Rogers et al. | 455/466 |
| 6,317,593 B1 * | 11/2001 | Vossler | 455/414.1 |
| 6,381,456 B1 | 4/2002 | Ko | 455/435.1 |
| 6,470,179 B1 | 10/2002 | Chow et al. | 455/406 |
| 6,516,193 B1 | 2/2003 | Salmela et al. | 455/432.3 |
| 6,597,910 B1 | 7/2003 | Ra | 455/433 |
| 6,681,111 B2 | 1/2004 | Ahn et al. | 455/432.2 |
| 6,684,069 B1 | 1/2004 | Yoon | 455/414.1 |
| 2002/0045468 A1 | 4/2002 | Jalili | 455/567 |

* cited by examiner

*Primary Examiner*—George Eng
*Assistant Examiner*—Marcos L Torres
(74) *Attorney, Agent, or Firm*—KED & Associates, LLP (57) ABSTRACT

A method for reporting an activation status of an feature service such as termination conversion or termination rejection to a subscriber comprising the steps of activating a certain feature service using a feature code, and reporting the activation status of the feature service if a mobile station requests a location registration or a call origination is capable of reporting the activation status of the feature service to the subscriber at the preferable time or periodically using the service control point (SCP).

4 Claims, 6 Drawing Sheets

METHOD FOR REPORTING ACTIVATION STATUS OF FEATURE SERVICE IN MOBILE COMMUNICATION SYSTEM

This application is a Continuation application of Ser. No. 09/984,031 filed Oct. 26, 2001, now U.S. Pat. No. 7,187,939 which claims priority to Application Serial No. 2000/63982 filed in Korea on Oct. 30, 2000 and Application Serial No. 2000/84716 filed in Korea on Dec. 28, 2000, the entirety of which is incorporated herein by reference.

BACKGROUND

1. Field

The present invention relates to a mobile communication system and more particularly, to a method for reporting activation status of feature service in a mobile communication system that can report activation status of feature services such as termination conversion and termination rejection to a subscriber.

2. Description of the Background Art

The current mobile communication system provides many feature services to subscribers. Among the services, the termination conversion and transmission rejection service are feature services for preventing a call termination to a mobile terminal of the subscriber and the subscriber activates or inactivates the operation of the corresponding service after registering the use of the feature service to the service provider. Therefore, the subscriber can reduce interruption of a telephone call for a short time before the feature service is inactivated before by activating the above feature service on a particular condition or for a particular object.

Activation or inactivation of the conventional feature service is done by a subscriber using an feature code or by a service provider in accordance with requests of the subscriber or an object in terms of operation. At this time the feature code is a code designated for recognizing the feature service and the code can be designated in each mobile communication service provider.

Figure 1:
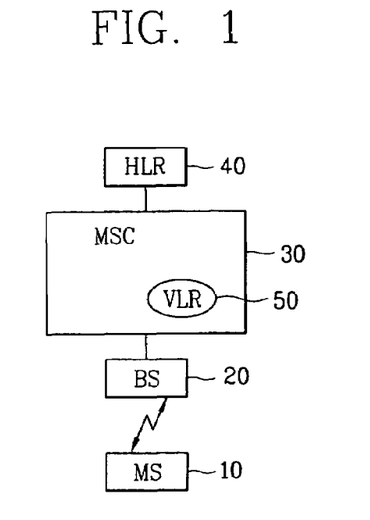
FIG. 1 is a schematic block diagram illustrating a conventional mobile communication system.
Figure 2:
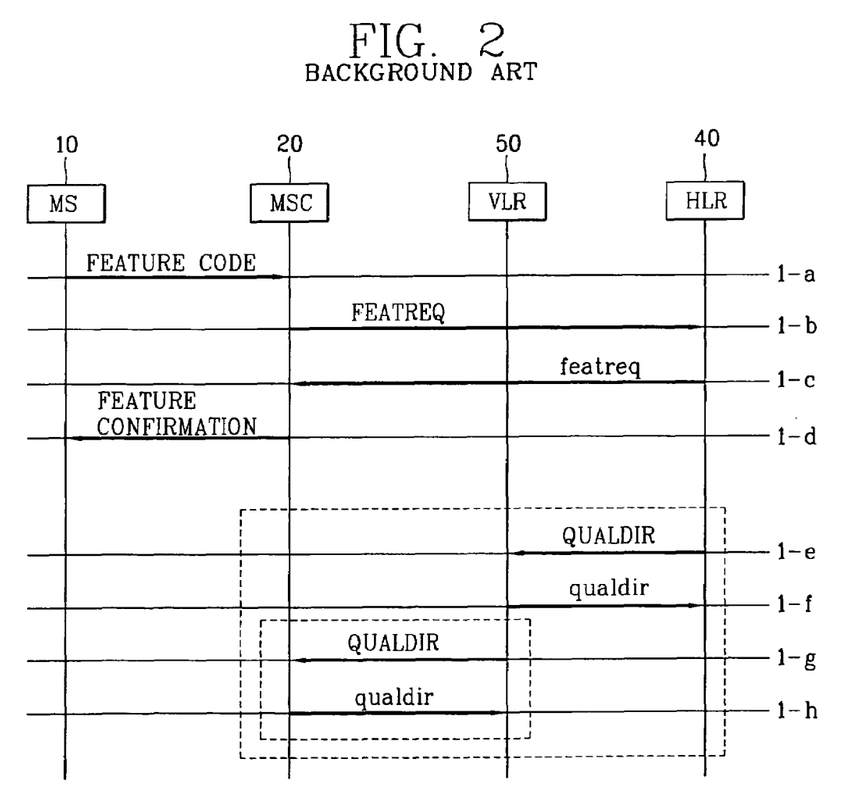
FIG. 2 is a view showing the method for activating the feature service in the mobile communication system of FIG. 1.

FIG. 1 is a schematic block diagram illustrating a conventional mobile communication system, and FIG. 2 is a view showing the method for activating the feature service in the mobile communication system of FIG. 1.

A subscriber transmits a code corresponding to the feature service which will be activated through the Mobile Station (MS) 10 and base station 20 to the Mobile Switching Center (MSC) 30 (1-*a*). The MSC 30 checks the feature code by analyzing the origination number dialed by the subscriber and then transmits the feature service processing request signal FEATREQ (feature request) to the Home Location Register (HLR) 40 (1-*b*).

The HLR 40 analyzes the feature code transmitted from the MSC 30 and makes sure to which service the corresponding feature code is applicable and whether the feature code is a code for activating or inactivating the feature service.

If the kind and activation type of the feature service are identified, the HLR 40 stores the status information of the corresponding feature service in the data base (DB) and then transmits the response signal featreq on the feature code processing request to the MSC 30 (1-*c*). At this time, the response signal featreq includes a feature code processing result and a output type (Tone or announcement) of the feature code processing result. The HLR 40 conducts failure processing in case the feature code which the subscriber transmitted is not a valid code.

Therefore, the MSC 30 analyzes the response signal featreq from the HLR 40 and reports the feature code processing result in the form of the Tone or announcement to the MS 10 by using a feature confirmation (1-*d*).

On the other hand, if the status of the feature service is changed by the subscriber, the HLR 40 transmits the status information of the feature service to the Visitor Location Register (VLR) 50 wherein the subscriber is positioned in accordance with the kind of the feature service.

Namely, as shown in FIG. 2, the HLR 40 reports the status information of the feature service by transmitting an authority information command (QUALDIR: Qualification Directive) to the VLR 50 in case that the status information (activation inactivation) of the feature service is stored (1-*e*). The VLR 50 updates the status information of the feature service and transmits the response signal qualdir to the HLR 40 (1-*f*). Also, the VLR 50 ends a storing process of the feature service information by transmitting the QUALDIR to the MSC 30 and then receiving the response signal qualdir corresponding to the QUALDIR from the MSC 30 (1-*g* and 1-*h*).

Meanwhile, the activation or inactivation of the feature service in the mobile communication network can be processed by a customer management system of the service provider as well as the subscriber. The customer management system requests the change of the feature service information using a protocol defined between the customer management system and HLR 40. The HLR 40 changes the corresponding feature service information in the subscriber DB, and then reports the processing results to the customer management system.

Therefore, the MSC 30 and HLR 40 provides the corresponding feature service to the subscriber in accordance with the changed feature service status in case that subscriber is requested to originate or terminate a call.

A subscriber can prevent interruption from telephone calls for a while at a certain time and location by setting the activation or inactivation status of the feature service using the feature code. Even if a certain object or condition of the subscriber ends and the subscriber is able to receive phone calls again, the subscriber occasionally forgets that he or she activated the feature service and does not inactivate the feature service again. Therefore, conventionally, there was a problem that a subscriber can not get on line until the corresponding service is inactivated recognizing the activation status of the feature service.

SUMMARY

Therefore, an object of the present invention is to provide a method for reporting activation status of feature service which can provide a subscriber convenience of using terminals by reporting the activation status of the feature service to the subscriber.

To achieve these and other advantages and in accordance with the purpose of the present invention, as embodied and broadly described herein, there is provided a method for reporting activation status of feature service comprising the steps of: activating a certain feature service using a feature code; and reporting the activation status of the feature service to a mobile station if the mobile station requests a location registration or a call origination.

To achieve these and other advantages and in accordance with the purpose of the present invention, as embodied and broadly described herein, there is provided a method for reporting activation status of feature service comprising the steps of: receiving a feature code from a mobile station (MS); discriminating a feature service type by analyzing the received feature code in a home location register (HLR); setting an activation status of the feature service and a reporting time of the activation status based upon the discriminated feature service type; reporting the activation status of the feature service to the MS in accordance with the set activation status reporting time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Reference will now be made in detail to the preferred embodiments of the present invention, examples of which are illustrated in the accompanying drawings.

The present invention provides a method for reporting the activation status of the feature service such as termination conversion or termination rejection. The present invention reports the activation status of the feature service in the form of a Pip Tone or Short Message when the location of a subscriber is moved or the subscriber tries to originate. Also, the present invention can report the activation status of the feature service at a favorite time or periodically using the Service Control Point (SCP) without the above time limitation.

Figure 3:
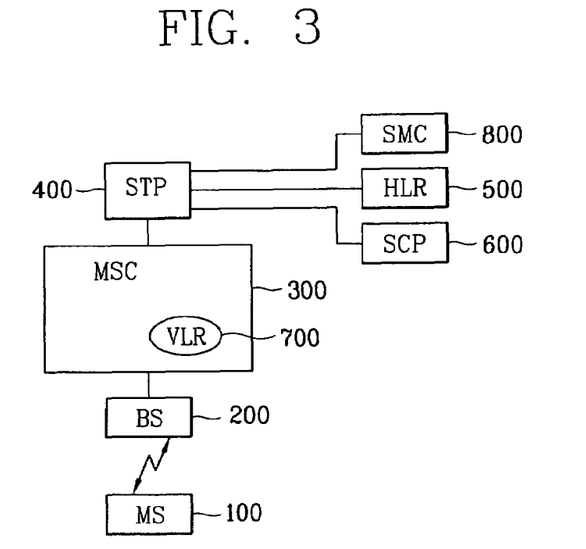
FIG. 3 is a schematic block diagram illustrating a mobile communication system in accordance with the present invention.
Figure 4:
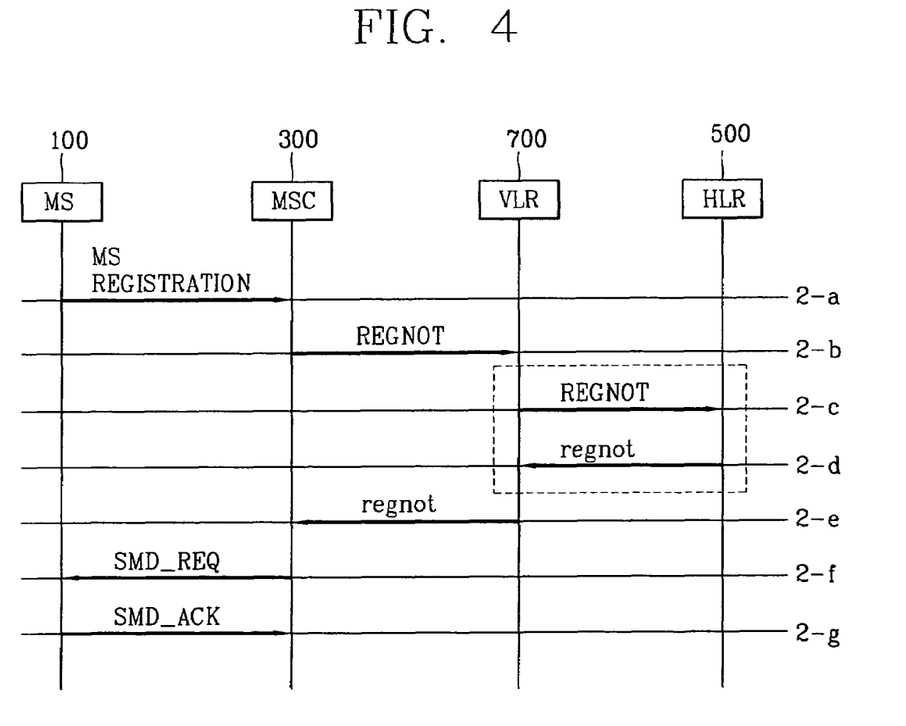
FIG. 4 is a view showing the method for reporting the activation status of the feature service according to the first embodiment of the present invention.

FIG. 3 is a schematic block diagram illustrating a mobile communication system in accordance with the present invention, and FIG. 4 is a view showing the method for reporting the activation status of the feature service according to the first embodiment of the present invention.

As shown in FIG. 4, in case the MS 100 of a subscriber moves to a new area or the subscriber turns on the power of the MS 100, the MS 100 transmits a message requesting a location registration to the MSC 300 through a base station 200 (2-*a*). The MSC 300 transmits a registration reporting signal (REGNOT: Registration Notification) to the VLR 700 through a Signaling Transfer Point (STP) 400 after it checks the transmitted message is a message for requesting location registration (2-*b*).

The VLR 700 registers a location information of the subscriber in accordance with the registration reporting signal REGNOT in case the subscriber who requests the location registration is a registered subscriber. On the other hand, in case the subscriber is not a registered subscriber, VLR 700 transmits the REGNOT for requesting the location registration processing to the HLR 500(2-*c*). Thus, the HLR 500 processes the location registration of the subscriber and transmits the response signal reqnot that corresponds to the request of location registration of the subscriber to the VLR 700 (2-*d*).

The VLR 700 transmits the response signal regnot to the registration reporting signal REGNOT to the MSC 300. At this time, in ease the feature service is on the activated condition, the activation status information of the corresponding feature service is included in the response signal regnot and transmitted (2-*e*). Therefore, after the MSC 300 detects the activation status of the feature service by analyzing the response signal regnot of the VLR 700, the MSC 300 reports the activation status of the feature service with the MS 100 of the subscriber (2-*f*) and receives the response signal (SMD-ACK) (2-*g*). At this time, a short message through a Short Message Delivery Request (SMD_REQ) or a Pip Tone is used as the reporting method. The present invention reports the activation status of the feature service using a short message since sound does not come out in case of converting or prohibiting termination. Also, the short message can be transmitted directly from the MSC 300 to the MS 100 or transmitted through the short message center.

Figure 5:
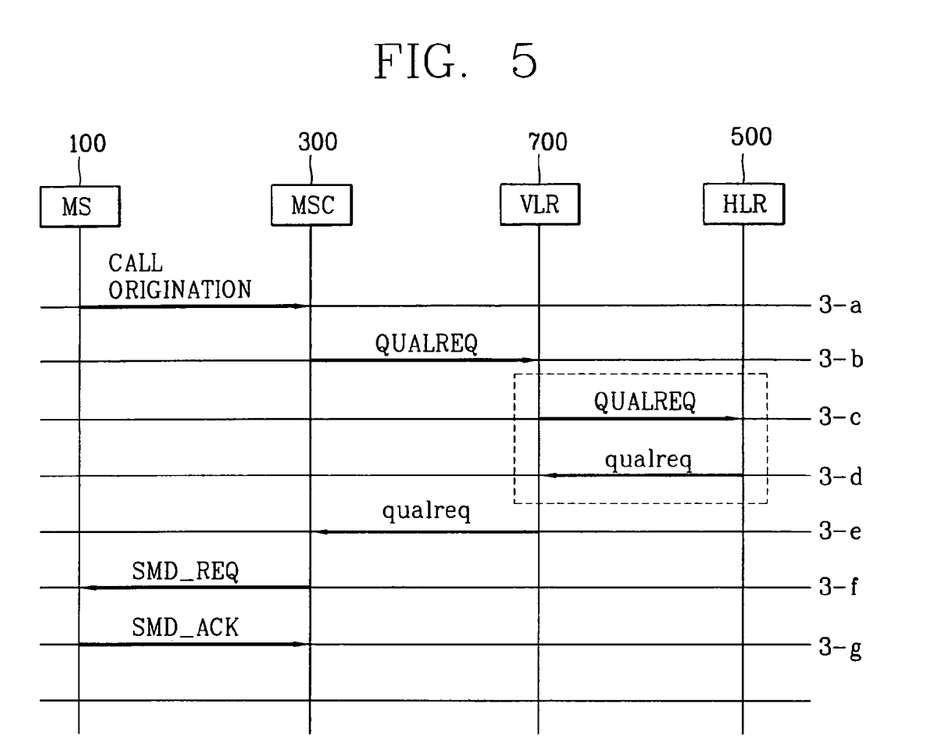
FIG. 5 is a view showing the method for reporting the activation status of the feature service according to the second embodiment of the present invention.

FIG. 5 is a view showing the method for reporting the activation status of the feature service according to the second embodiment of the present invention.

As apparent from FIG. 5, when the MS 100 of a subscriber tries to originate a call the MSC 300 analyzes the transmitted origination number and the originator number and then performs origination processing using the subscriber information of the subscriber (3-*a*). If the origination subscriber information does not exist, the MSC 300 requests the subscriber information by transmitting the authority information command (QUALREQ: Qualification Request) for requesting the subscriber information to the VLR 700 (3-*c*).

If the origination subscriber information exists, the VLR 700 transmits the subscriber information as the response signal of the QUALREQ to the MSC 300 (3-*e*). On the other hand, if the subscriber information does not exist, the VLR 700 transmits the QUALREQ to the HLR 500 again and requests the subscriber information (3-*c*). The HLR 500 analyzes the transmitted QUALREQ and transmits the subscriber information as the response signal qualreq to the VLR 700 (3-*d*), and the VLR 700 transmits the corresponding subscriber information as a respond signal qualreq to the MSC 300 (3-*e*).

The subscriber information transmitted from the VLR 700 to the MSC 300 includes the information indicating the activation status of the feature service. Therefore, the MSC 300 can check the activation status of the feature service such as a termination conversion or a termination rejection using the transmitted subscriber information. In case the feature service is activated, the MSC 300 performs the origination call processing and transmits a short message indicating the activation status of the feature service to the MS 100 using the SMD_REQ, and receives the response signal (SMD_ACK) (3-*f* and 3-*g*).

In the first and second embodiment of the present invention, the activation the method for reporting activation status of the feature service in case the location of the subscriber is changed or the subscriber tries to originate is described. However, the present invention can report the activation status of the feature service to the MS at the subscriber's preferable time or periodically.

Figure 6:
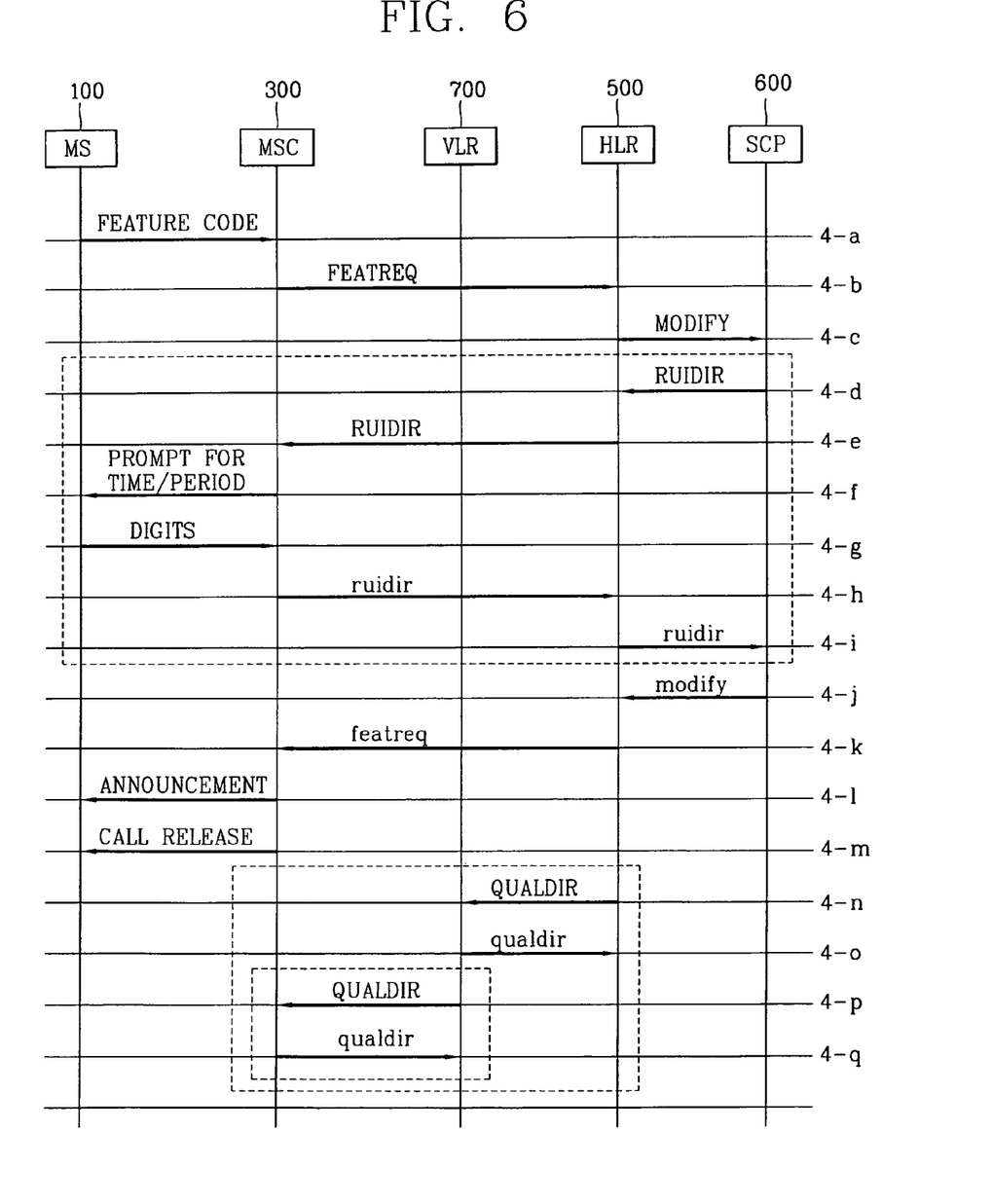
FIG. 6 is a view showing the method for setting the activation status and the reporting time of the activation status of the feature service in accordance with the present invention in the service control network.

FIG. 6 is a feature code processing procedure for setting the activation status of the feature service and a reporting period of the set activation status.

As shown in FIG. 6, when the feature code for setting the activation status of the feature service or/and the reporting time of the activation status is transmitted from the subscriber (4-*a*), the MSC 300 transmits the FEATREQ to the HLR 500 through the STP 400 after recognizing the above feature code (4-*b*).

The HLR 500 analyzes the transmitted FEATREQ and checks whether the transmitted feature code is indicating as conventionally or whether the code is for activation or inactivation. If the kind and the status of the feature service is checked, the HLR 500 stores the status information of the feature service in the DB and then transmits a signal (MODIFY) for requesting changing of the status information of the feature service to the Service Control Point (SCP) 600 (4-*c*). At this time, in case the subscriber inputs only the feature code for activating the feature service, the SCP 600 changes the activation status of the feature service according to the information request of the HLR 500 and then transmits the processing result of the feature service to the HLR 500 as a response signal.

In case the subscriber activates the status information of the feature service and at the same time, inputs the feature code for setting the reporting time of the feature service, the SCP 600 changes the activation status of the corresponding feature service according to the request for information change and then transmits the subscriber information requesting command (RUIDIR: Remote User Interaction Directive) to the HLR 500 to obtain the additional information from the subscriber (4-*d*). Therefore, the HLR 500 receives the reporting time or period of the activation information from the MSC 300 using the Remote User Interaction function and transmits it to the SCP 600 (4-*e*~4-*i*). The SCP 600 sets the reporting time of the feature service and transmits the response signal modify reporting the processing results to the HLR 500 (4-*j*). Since the later operations are the same as the conventional ones, the description is omitted.

Figure 7:
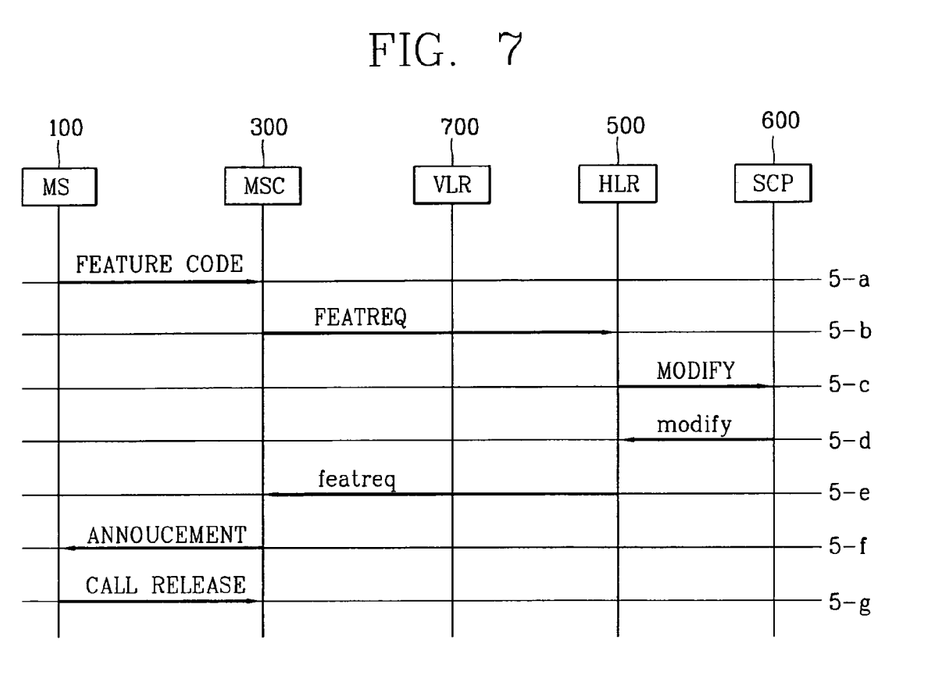
FIG. 7 is a view showing the method for changing the reporting time of the activation status of the feature service in FIG. 4.

FIG. 7 is a feature code processing procedure for changing the reporting time or reporting period of the feature service in accordance with the present invention.

When the subscriber transmits the feature code for changing the reporting period of the feature service using the MS 100 (5-*a*). The MSC 300 transmits the feature code processing request signal FEATREQ to the HLR 500 after checking that the origination number is the feature code (5-*b*). The HLR 500 analyzes the FEATREQ transmitted from the MSC 300 and requests the change of the reporting time to the SCP 600 in case that the transmitted feature code is a code for setting the reporting time(period) of the activation status (5-*c*).

Therefore, the SCP 600 changes the reporting time of the corresponding feature service according to a reporting time change signal MODIFY inputted from the HLR 500 and then stores the changed value in the DB. When the storing operation is finished, the SCP 600 transmits the response signal modify including the changed results of the reporting time to the HLR 500 (5-*d*), and the HLR 500 transmits the response signal featreq with respect to the feature code processing request to the MSC 300 (5-*e*). Therefore, the MSC 300 analyzes the response signal featreq received from the HLR 500 and disconnects the call after reporting the feature code processing results to the MS 100 in the form of a Tone or announcement as same as conventionally by analyzing the response signal featreq to the processing request of the feature code (5-*f* and 5-*g*).

Figure 8:
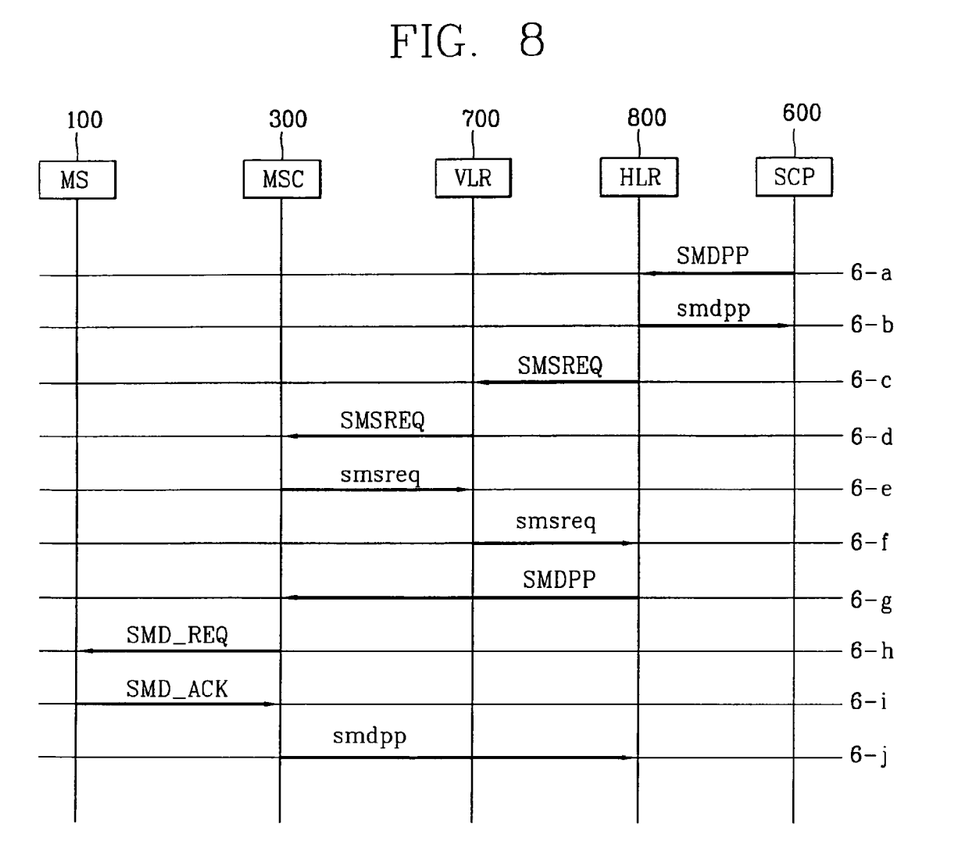
FIG. 8 is a view showing the method for reporting the activation status of feature service in accordance with the third embodiment of the present invention.

As shown in FIG. 8, the reporting time of a certain feature service predetermined by the internal timer function comes, the SCP 600 requests the short message transmission by transmitting a short message transmission signal (SMDPP: Short Message Delivery Point-to-Point) to the HLR 800 (6-*a*). The HLR 800 transmits a short message request signal SMSREQ to the MSC 300 through the VLR 700 and obtains the routing information for transmission of the short message from the MSC 300 (6-*c*~6-*f*). Once the routing information is obtained, the HLR 800 transmits a short message to the MSC 300 as same as the conventional short message processing so that die corresponding short message is transmitted to the MS 100 (6-*g*~6-*j*).

Through the procedures, the subscriber can prevent an unfavorable call conversion or call rejection by receiving the activation or inactivation status of the feature service which affects on the termination and origination with a terminal when a certain time or period comes.

The embodiments of the present invention are examples and does not limit the claims. Also, various alternatives, revisions and amendments will be self-evident to a person with an ordinary knowledge.

As described above, the present invention has an effect that the subscriber can take proper measures recognizing the activation status of the feature service and being reported about the activation status of the feature service in case the subscriber prohibits termination to the terminal by activating the feature service such as termination conversion or termination rejection.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method of implementing a feature service of a mobile communication system having a mobile communication network and a mobile terminal, the method performed by the mobile terminal, comprising:

performing a registration procedure with the mobile communication network;

transmitting information of a feature code from the mobile terminal to the mobile communication network in response to a user input after the registration procedure is completed, wherein the information of the feature code includes a reporting time of status information relating to the feature service of the mobile communication system;

requesting to establish a communication link between the mobile terminal and the mobile communication network after the feature code is transmitted from the mobile terminal to the mobile communication network, the communication connection being for a voice call or a data transfer procedure;

receiving status information of the feature service from the mobile communication network based on the request to establish the communication link and based on the reporting time transmitted to the mobile communication network;

processing the request to establish the communication link, according to the received status information of the feature service; and periodically receiving additional status information of the feature service of the mobile communication system from the mobile communication network.

2. The method of claim 1, wherein the additional status information of the feature service is received based on a reporting time set by the user.

3. The method of claim 1, wherein the status information comprises an inactive status of the feature service.

4. The method of claim 1, wherein the additional status information comprises an inactive status of the feature service.

* * * * *